United States Patent [19]

Sterzel et al.

[11] Patent Number: 5,145,900
[45] Date of Patent: Sep. 8, 1992

[54] THERMOPLASTIC MATERIALS FOR THE PRODUCTION OF CERAMIC MOLDINGS

[75] Inventors: Hans-Josef Sterzel, Dannstadt-Schauernheim; Johan H. H. Ter Maat, Mannheim; Johan Ebenhoech, Ludwigshafen; Marion Meyer, Boehl-Iggelheim, all of Fed. Rep. of Germany

[73] Assignee: BASF Aktiengesellschaft, Ludwigshafen, Fed. Rep. of Germany

[21] Appl. No.: 823,607

[22] Filed: Jan. 17, 1992

Related U.S. Application Data

[63] Continuation of Ser. No. 652,600, Feb. 8, 1991, abandoned.

[30] Foreign Application Priority Data

Feb. 21, 1990 [DE] Fed. Rep. of Germany ....... 4005374
Jul. 7, 1990 [DE] Fed. Rep. of Germany ....... 4021741

[51] Int. Cl.$^5$ .................... C08K 3/38; C08K 3/10; C08K 3/28; C08K 3/18
[52] U.S. Cl. .................... 524/404; 524/413; 524/428; 524/430; 524/437; 524/443
[58] Field of Search ............... 524/404, 413, 428, 430, 524/437, 443

[56] References Cited

U.S. PATENT DOCUMENTS

| | | | |
|---|---|---|---|
| 4,018,727 | 4/1977 | Taylor | 523/207 |
| 4,139,575 | 2/1979 | Amann et al. | 524/354 |
| 4,517,319 | 5/1985 | Reske et al. | 524/413 |
| 4,624,812 | 11/1986 | Farrow et al. | 524/413 |
| 4,671,912 | 6/1987 | Komatsu et al. | 264/63 |
| 4,683,267 | 7/1987 | Lindner et al. | 525/411 |
| 4,708,838 | 11/1987 | Bandyopadhyay et al. | 264/63 |
| 4,978,725 | 12/1990 | Reske et al. | 525/410 |

FOREIGN PATENT DOCUMENTS

| | | |
|---|---|---|
| 114746 | 8/1984 | European Pat. Off. . |
| 115104 | 8/1984 | European Pat. Off. . |
| 125912 | 11/1984 | European Pat. Off. . |
| 206685 | 12/1986 | European Pat. Off. . |
| 62012674 | 1/1987 | United Kingdom . |
| 62278160 | 12/1987 | United Kingdom . |

*Primary Examiner*—Paul R. Michl
*Assistant Examiner*—Peter Szekely
*Attorney, Agent, or Firm*—Oblon, Spivak, McClelland, Maier & Neustadt

[57] ABSTRACT

Thermoplastic materials for the production of ceramic moldings contain

A) 40–65% by volume of a sinterable inorganic nonmetallic powder,
B) 35–60% by volume of a mixture of
  B1) 70–90% by weight of a polyoxymethylene homo- or copolymer having up to 10 mol % of comonomer units and
  B2) 10–30% by weight of a polyoxymethylene copolymer with a comonomer content of 20–99 mol %, poly-1,3-dioxolane, poly-1,3-dioxane or poly-1,3-dioxepan, or of a polymer which is homogeneously dissolved or is dispersed with a mean particle size of less than 1 μm in B1) or a mixture thereof,
as a binder, and
C) 0–5% by volume of a dispersant.

8 Claims, No Drawings

THERMOPLASTIC MATERIALS FOR THE PRODUCTION OF CERAMIC MOLDINGS

This application is a continuation of application Ser. No. 07/652,600, filed on Feb. 8, 1991, now abandoned.

The present invention relates to thermoplastic materials for the production of ceramic moldings, containing
A) 40-65% by volume of a sinterable inorganic nonmetallic powder,
B) 35-60% by volume of a mixture of
B1) 70-90% by weight of a polyoxymethylene homo- or copolymer having up to 10 mol% of comonomer units and
B2) 10-30% by weight of a polyoxymethylene copolymer with a comonomer content of 20-99 mol%, poly-1,3-dioxolane, poly-1,3-dioxane or poly1,3-dioxepan, or of a polymer which is homogeneously dissolved or is dispersed with a mean particle size of less than 1 μm in B1) or a mixture thereof,
as a binder, and
C) 0-5% by volume of a dispersant.

The present invention furthermore relates to the use of such thermoplastic materials for the production of ceramic moldings and to the ceramic moldings themselves. Finally, the present invention also relates to a process for removing the binder from a molding of such a thermoplastic material.

It is known that moldings can be produced from ceramic materials by a method in which a ceramic powder is mixed with a thermoplastic resin, the mixture is molded to give a green compact, the thermoplastic resin is removed and the green compact is then sintered to give the molding. According to European Patent 125,912, the green compact is converted essentially into its final shape before being sintered. The thermoplastic resin or binder used is, for example, polystyrene, polypropylene, polyethylene or an ethylene/vinyl acetate copolymer. These binders are removed from the green compact by heating to 300°-550° C. for from 3 to 8 hours, the binders undergoing thermal cleavage. Heating to these temperatures must be carried out very carefully and slowly so that the green compact is not damaged as a result of uncontrolled decomposition of the organic substance and hence cracking. For this reason, the heating rate should be only 4° C./hour. U.S. Pat. No. 4,671,912 even recommends lower heating rates of from 1° to 2° C./hour, until not less than half of the binder has been removed. These long heating periods of several days greatly reduce the costefficiency of these processes.

To shorten the heating times, it is recommended in European Patent 115,104 that a mixture of an oxidized paraffin wax or an oxidized microcrystalline wax with a higher fatty acid be used as the binder. European Patent 114,746 proposes a polyacetal as the binder.

A disadvantage of all these processes in which thermoplastics or waxes are used is that the green compact has to be heated to temperatures above the softening point of the binder for pyrolytic removal of the binder, with the result that there is a danger of deformation. To avoid such deformation, U.S. Pat. No. 4,708,838 and Japanese Preliminary Published Application 62/12674 therefore propose embedding the green compact in a ceramic powder having high thermal stability.

However, removal of the binder from the green compact by extraction with a solvent instead of by pyrolysis is also known. According to Japanese Preliminary Published Application 62/728160, supercritical carbon dioxide at 60° C. and at a pressure of 200 kg/cm² is used as the solvent, while European Patent 206,685 describes the use of liquid carbon dioxide at from −30° to 31.1° C. To carry out these processes, however, special pressure apparatuses are required.

German Patent Applications P 39 26 869 and P 40 00 278 describe a process for the production of a sintered inorganic molding by shaping a mixture of a sinterable inorganic powder and polyoxymethylene with or without comonomers (for example according to EP-A 114 746) as the binder by injection molding or extrusion to give a green compact, removing the binder and carrying out sintering, wherein the polyoxymethylene is removed by treating the green compact in a gaseous, acid-containing atmosphere. The acids used in this process are protic acids, ie. acids which are cleaved into a proton (hydrated) and an anion on reaction with water, or $BF_3$ or adducts thereof.

When pure polyoxymethylene having a small comonomer content is used as the binder in the processes of the abovementioned prior German Applications for the production of moldings or shaped articles having great wall thicknesses, however, the high crystallization rate of the polyoxymethylene gives rise to a problem. The melt solidifies more rapidly on the wall of the usually cooled mold used in injection molding more rapidly than in the interior, ie. the inner region of the molding crystallizes later than the outer part. Since the crystallization is accompanied by a volume contraction, cracks form in the interior of the molding since the already solidified outer parts can no longer accommodate the volume contraction.

The abovementioned EP-A 114 746 proposes that a polyoxymethylene copolymer containing from 20 to 80 mol % of comonomer preferably be used. Such copolymers have a lower melting point, a lower crystallinity and greater softness and flexibility than the corresponding polyoxymethylene homopolymers.

However, this also results in the cooling times being substantially prolonged and the tendency of the shaped article to stick in the mold being increased. Owing to the lower melting points of the copolymers, removal of the binder also has to be carried out at lower temperatures, with the result that the time required for removal of the binder is longer.

It is an object of the present invention to provide thermoplastic materials for the production of ceramic moldings, which materials do not have the disadvantages described above and from which crack-free and pore-free ceramic moldings can be produced in an economical process.

We have found that this object is achieved, according to the invention.

The novel thermoplastic materials contain, as component A), from 40 to 65, preferably from 40 to 60, % by volume of a sinterable inorganic nonmetallic powder. Preferred powders of this type are oxide ceramic powders, such as $Al_2O_3$, $ZrO_2$ and $Y_2O_3$, as well as non-oxide ceramic powders, such as SiC, $Si_3N_4$, TiB and AlN, which can be used individually or in the form of mixtures. The median particle size (particle diameter $d_{50}$, ie. the diameter above and below which the particle size of 50% of the particle lies) is in general from 0.1 to 50 μm, preferably from 0.5 to 30 μm, in particular from 0.2 to 10μm.

Some of component A), preferably not more than 50, in particular from 10 to 20, % by weight, based on component A), may be replaced by inorganic fibers or whiskers, for example of $Al_2O_3$, SiC or $Si_3N_4$.

The novel thermoplastic materials contain, as component B), from 35 to 60, preferably from 40 to 55, % by volume of a mixture of B1) from 70 to 90, preferably from 80 to 88, % by weight, based on B), of a polyoxymethylene homopolymer or copolymer having not more than 10, preferably from 2 to 7, mol% of comonomer units and B2) from 10 to 30, preferably from 10 to 25, in particular from 12 to 20, % by weight of a polyoxymethylene copolymer with a comonomer content of 20–99, preferably 25 to 95 and in particular 25 to 80, mol%, poly-1,3-dioxolane, poly-1,3-dioxane or poly1,3-dioxepan, or of a polymer which is homogeneously dissolved or dispersed with a mean particle size of less than 1 μm, preferably from 0.01 to 0.9 μm, in particular from 0.1 to 0.8 μm, in B1) or a mixture thereof, as a binder.

The polyoxymethylene homo- or copolymers are familiar to the skilled worker and are described in the literature.

The homopolymers are generally prepared by polymerization of formaldehyde and trioxane, preferably in the presence of suitable catalysts.

Polyoxymethylene copolymers B1 and, where appropriate, B2 which are preferred in connection with the invention contain, in addition to the repeating units —$OCH_2$—, repeating units of the formula

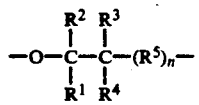

where $R^1$ to $R^4$ independently of one another are each hydrogen, $C_1$-$C_4$-alkyl or halogen-substituted alkyl of 1 to 4 carbon atoms and $R^5$ is —$CH_2$—, —$CH_2O$—, a $C_1$-$C_4$-alkyl- or $C_1$-$C_4$-haloalkyl-substituted methylene group or a corresponding oxymethylene group and n is 0-3. These groups can advantageously be introduced into the copolymers by ring cleavage of cyclic ethers. Preferred cyclic ethers are those of the formula

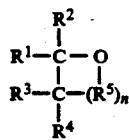

where $R^1$ to $R^5$ and n have the abovementioned meanings. Ethylene oxide, 1,2-propylene oxide, 1,2-butylene oxide, 1,3-butylene oxide, 1,3-dioxane, 1,3-dioxolane and dioxepan may be mentioned as cyclic ethers and linear oligo- or polyformals, such as polydioxolane or polydioxepan, as comonomers, merely by way of example.

Polyoxymethylene copolymers B1) and B2) can in principle have the same repeating units, and thus differ only in the proportions in which these units are present.

Other suitable components B) are oxymethylene terpolymers, which are prepared, for example, by reacting trioxane and one of the cyclic ethers described above with a third monomer, preferably a bifunctional compound of the formula

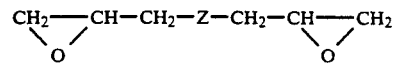

where Z is a chemical bond, —O— or —ORO— (R=$C_1$-$C_8$-alkylene or $C_2$-$C_8$-cycloalkylene).

Preferred monomers of this type are ethylene diglycide, diglycidyl ether and diethers of glycidylene and formaldehyde, dioxane or trioxane in a molar ratio of 2:1 and diethers of 2 moles of a glycidyl compound and 1 mole of an aliphatic diol of 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to mention but a few examples.

Processes for the preparation of the homo- and copolymers described above are familiar to the skilled worker and are described in the literature, so that further information in this context is unnecessary.

The preferred polyoxymethylene homo- and copolymers have melting points of not less than 150° C. and weight average molecular weights of from 5,000 to 150,000, preferably from 7,000 to 60,000.

Preferred components B2) are
Poly-1,3-dioxolane-O—$CH_2$—O—$CH_2$—$CH_2$— or
Poly-1,3-dioxane-O—$CH_2$—O—$CH_2$—$CH_2$—$CH_2$— or
Poly-1,3-dioxepan-O—$CH_2$—O—$CH_2$—$CH_2$—$CH_2$—$CH_2$ or mixtures of these with one another or with polyoxymethylene copolymers of the type described above. Poly-1,3-dioxepan undergoes rapid depolymerization under acidic conditions and is therefore particularly preferred.

Poly-1,3-dioxolane, poly-1,3-dioxane and poly1,3-dioxepan can be prepared by processes similar to those for the polyoxymethylene homopolymers and copolymers, so that no further information is necessary here. The molecular weight is in principle not critical and is in general in the same range as the molecular weight of the polyoxymethylene homopolymers or copolymers.

Under the conditions of compounding or injection molding, there is virtually no transacetalization between the polyoxymethylene polymers B1) and B2), ie. there is virtually no exchange of comonomer units.

Hence, the crystallite melting point of component B1) is also not depressed and only the crystallization time is slightly increased (which is desirable) and the crystallinity is slightly reduced. Since the crystallite melting point of the main component B1) is not reduced, the high heat distortion resistance is retained and the danger of distortion during catalytic removal of the binder is reduced.

Suitable components B2) are furthermore polymers which dissolve homogeneously in the polyoxymethylene homo- or copolymer B1) or are dispersible therein in the required particle size.

Preferred polymers of this type are aliphatic polyurethanes, aliphatic uncrosslinked polyepoxides, poly-$C_2$-$C_6$-alkylene oxides, aliphatic polyamides and polyacrylates, as well as mixtures thereof.

Suitable aliphatic polyurethanes can be prepared in a known manner by polyaddition of aliphatic polyisocyanates, in particular aliphatic diisocyanates, and aliphatic polyhydroxy compounds, such as polyesters, polyethers, polyesteramides or polyacetals, or mixtures thereof, in the presence or absence of chain extenders. Suitable aliphatic polyisocyanates are in particular aliphatic diisocyanates of the general formula

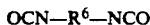

where $R^6$ is a saturated straight-chain or branched aliphatic radical of 1 to 20, preferably 2 to 12, carbon atoms or an unsubstituted or substituted saturated cycloaliphatic divalent radical of 4 to 20, preferably 6 to 15, carbon atoms.

In the above formula, $R^6$ may furthermore be a combination of divalent open-chain aliphatic and cycloaliphatic radicals, for example

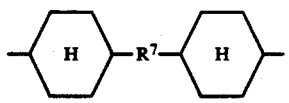

where $R^7$ is a saturated straight-chain or branched aliphatic radical of 1 to 8, preferably 1 to 3, carbon atoms. The two rings are each preferably unsubstituted cyclohexane while $R^7$ is preferably methylene, ethylene, methylmethylene or dimethylmethylene.

If $R^5$ is an open-chain divalent radical, it is preferably a straight-chain alkylidene radical ($-CH_2)_n-$ in which n is from 2 to 12. Examples of this are ethylidene, propylidene, pentamethylene and hexamethylene as well as 2-methylpentamethylene, 2,2,4-trimethylhexamethylene and 2,4,4-trimethylhexamethylene. Diisocyanates of this type, which are particularly preferred, are hexamethylene diisocyanate and 2,2,4- and 2,4,4-trimethylhexamethylene diisocyanate.

If, in the above formula, $R^6$ is a cycloaliphatic radical, it is preferably the unsubstituted or substituted cyclohexane radical. Examples of diisocyanates of this type are 1,2- or 1,4-diisocyanatomethylcyclohexane or isophorone diisocyanate.

The diisocyanates may also be used in oligomeric, for example dimeric or trimeric, form. Instead of the polyisocyanates, it is also possible to use conventional blocked polyisocyanates, which are obtained from the stated isocyanates, for example by an addition reaction of phenol or caprolactam.

Suitable aliphatic polyhydroxy compounds are polyethers, such as polyethylene glycol ethers, polypropylene glycol ethers and polybutylene glycol ethers, poly-1,4-butanediol ethers or copolyethers of ethylene oxide and propylene oxide. Polyesteramides, polyacetals and, preferably, aliphatic polyesters can also be used for this purpose, all these compounds having free terminal OH groups.

The preferably used aliphatic polyesters are essentially uncrosslinked polyesters having molecular weights of from 500 to 10,000, preferably from 500 to 5,000. The acid components are derived from straight-chain and/or branched aliphatic dicarboxylic acids, for example dicarboxylic acids of the general formula

where n is from 0 to 20, preferably from 4 to 10, in particular adipic acid and sebacic acid. Cycloaliphatic dicarboxylic acids, such as cyclohexanedicarboxylic acid, and mixtures with the above aliphatic dicarboxylic acids may also be used for this purpose.

Particularly suitable alcohol components for these polyesters are straight-chain or branched aliphatic primary diols, for example diols of the general formula

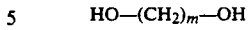

where m is from 2 to 12, preferably from 2 to 6. Examples of these are, in particular, ethylene glycol, 1,4-butanediol, 1,6-hexanediol and 2,2-dimethylpropane-1,3-diol and diethylene glycol. Cycloaliphatic diols, such as bishydroxymethylcyclohexane, or mixtures with the aliphatic diols are also suitable for this purpose.

The polyesters can each be prepared from one dicarboxylic acid and one diol or, as stated above, from a mixture of a plurality of dicarboxylic acids and/or a plurality of diols.

Particularly suitable chain extenders for the preparation of the polyurethanes are low molecular weight polyols, in particular diols, and polyamines, in particular diamines, or water.

The polyurethanes are preferably thermoplastic and therefore preferably essentially uncrosslinked, ie. can be melted repeatedly without significant signs of decomposition. Their reduced specific viscosities are as a rule from 0.5 to 3, preferably from 1 to 2, dl/g, measured at 30° C. in dimethylformamide.

Polymers of glycidyl (meth)acrylate or epichlorohydrin with suitable comonomers may be mentioned here merely as examples of aliphatic uncrosslinked polyepoxides. Copolymers of epichlorohydrin and 2,2-bis-(4-hydroxyphenyl)-propane (bisphenol A), which are commercially available under the names Epikote ® and Phenoxy ®, are preferred.

Particularly suitable poly-$C_2$-$C_6$-alkylene oxides are polyethylene oxide, polypropylene oxide and polytetrahydrofuran (polytetramethylene oxide) having number average molecular weights of from 2,000 to 20,000, preferably from 4,000 to 10,000. Corresponding products are commercially available and preparation processes are known to the skilled worker, so that further information is unnecessary here.

Particularly suitable aliphatic polyamides are amorphous polyamides or polyamides having low crystallinity.

A preferred group of such polyamides contains units derived from diamines of the formula

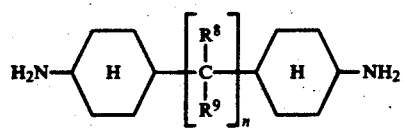

where $R^8$ and $R^9$ independently of one another are each H, methyl or ethyl and n is 0–6, and the cyclohexyl rings may be alkyl-substituted, and aliphatic dicarboxylic acids, such as adipic acid, azelaic acid, sebacic acid and dodecanedioic acid.

Diamines having this structure are generally referred to as dicyanodiamines; preferred diamines of this type are 4,4'-diaminodicyclohexylmethane

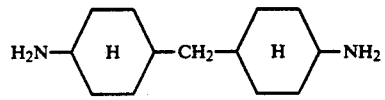

and the derivatives thereof which are methyl-substituted at the cyclohexyl rings.

In addition to the abovementioned units, preferred polyamides preferably contain further units derived from lactams or salts of further aliphatic diamines and aliphatic dicarboxylic acids.

Preferred lactams are ε-caprolactam and enantholactam and preferred salts are those of adipic acid and hexamethylenediamine. The molar ratio of the different units is not subject to any particular restriction and can therefore vary within wide limits.

Preferred polyamides are those having units derived from ε-caprolactam, adipic acid/hexamethylenediamine and adipic acid/4,4'-diaminodicyclohexylmethane.

Another preferred group of amorphous polyamides contains units which are derived from alkyl-substituted hexamethylenediamines and the abovementioned aliphatic dicarboxylic acids, and once again further units of the type described above may be present.

Polyamides of this type are prepared by polycondensation of the monomer components in the corresponding amounts; appropriate condensation processes are familiar to the skilled worker.

Polyacrylates as described in, for example, DE 38 05 052 may be mentioned as a final group of the polymers B2).

These consist of 40–100% by weight of methyl acrylate or ethyl acrylate or a mixture thereof and 0–60% by weight of units derived from monomers of the formula

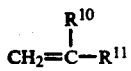

In this formula, $R^{10}$ is H or methyl and $R^{11}$ is a phenyl ring or a radical of the formula

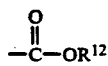

where $R^{12}$ is alkyl of 1 to 14 carbon atoms and is not —$CH_3$ or —$C_2H_5$ when $R^{10}$ is hydrogen.

Polyacrylates of this type are compatible with polyoxymethylene homo- and copolymers, this being evident from the fact that the mixture has only one glass transition temperature (Tg) or the Tg values of the individual components are shifted. Polymers of this type consisting of monomers of the formula I and, if required, further monomers, preferably those of the formula II, can be prepared by known polymerization processes, preferably by free radical polymerization, for example by emulsion, bead, solution or mass polymerization (cf. Kirk-Othmer, Encyclopedia of Chemical Technology 3rd Ed., Vol. 1, pp 330–342 and Vol. 18, pp 720–755, J. Wiley; H. Rauch-Puntigam, Th. Völker, Acryl- und Methacrylverbindungen). Suitable initiators are free radical initiators, such as peroxy compounds and azo compounds, depending on the monomers and the type of polymerization, the amounts of initiator generally being from 0.001 to 0.5% by weight, based on the monomers.

For example, peroxydisulfates or, if necessary, redox systems are suitable for the emulsion polymerization and both peroxides, such as dibenzoyl peroxide or dilauroyl peroxide, and azo compounds, eg. azoisobutyronitrile, are suitable for mass polymerization as well as for solution polymerization or bead polymerization. The conventional regulators, in particular mercaptans, eg. dodecyl mercaptan, can be used for regulating the molecular weight.

The polymerization is preferably carried out at elevated temperatures, for example above 50° C. The molecular weight is in general from 2,000 to 5,000,000, preferably from 20,000 to 3,000,000 (determined by light scattering: for the determination of the molecular weights, cf. Houben-Weyl, Methoden der Organischen Chemie, 4th Edition, Vol. 14/1, Georg Thieme-Verlag, Stuttgart 1961).

The novel thermoplastic materials may contain 0–5, preferably 1–5, % by volume of a dispersant as component C. Oligomeric polyethylene oxide having a mean molecular weight of 200–400, stearic acid, hydroxystearic acid, fatty alcohols, fatty alcohol sulfonates and block copolymers of ethylene oxide and propylene oxide may be mentioned here merely by way of example.

In addition, the thermoplastic materials may contain conventional additives and processing assistants which have an advantageous effect on the rheological properties of the mixtures during shaping.

The thermoplastic materials can be prepared by mixing components A) and B) in a conventional mixing apparatus, such as a kneader, a mill or an extruder. When mixing is carried out in an extruder, the mixture can be extruded and granulated.

For injection molding, it is possible to use the conventional screw-type and plunger-type injection molding machines. Molding is effected in general at from 170° to 220° C. and at from 3,000 to 20,000 kPa in molds which are at 80° to 150° C.

To remove the binder, the green compacts obtained after the molding process are treated with a gaseous acid-containing atmosphere, preferably by methods similar to that described in the prior German Patent Applications P 39 29 869 and 40 00 278.

In the novel process, this treatment is carried out at from 20° to 160° C. when using, as component B2), a polyoxymethylene copolymer, poly-1,3-dioxolane, -dioxane or -dioxepan, and at from 20° to 180° C. when using as component B2) a polymer homogeneously dissolved in B1), for from 0.1 to 24 h, preferably from 0.5 to 12 h.

Suitable acids for the treatment in this first stage of the novel process are inorganic acids which are gaseous at as low as room temperature or can be vaporized at the treatment temperature or lower. Examples are the hydrohalic acids and $HNO_3$. Suitable organic acids are those which have a boiling point of less than 130° C. at atmospheric pressure, for example formic acid, acetic acid or trifluoroacetic acid or mixtures thereof.

Other suitable acids are $BF_3$ or $BF_3$ etherates. Very generally, the required treatment time depends on the treatment temperature and on the concentration of the acid in the treatment atmosphere, as well as on the wall thickness of the shaped articles.

If a carrier gas is used, it is generally passed through the acid beforehand and laden with said acid. The carrier gas laden in this manner is then brought to the treatment temperature, which is advantageously higher than the loading temperature, in order to avoid condensation of the acid.

The acid is preferably mixed with the carrier gas via a metering means, and the mixture is heated in order to avoid condensation of the acid.

When using as component B2) a polymer homogeneously dissolved in B1), the treatment in the first stage is carried out until not less than 80, preferably not less than 90, % by weight of the polyoxymethylene component B1) of the binder has been removed. This can easily be detected from the decrease in weight. Thereafter, the resulting product is heated at from 250° to 500° C., preferably from 350° to 500° C., for from 0.1 to 12 h, preferably from 0.3 to 6 h, in order completely to remove the remainder of the binder still present. When using a polyoxymethylene copolymer, poly-1,3-dioxolane, -dioxane or -dioxepan as component B2), the treatment in the first stage is carried out until the binder has been almost completely removed. Thereafter, the product may be heated as described above. However, this is usually unnecessary, since the acid treatment alone is as a rule sufficient to remove the binder completely.

The product freed from the binder in this manner can be converted into a ceramic molding in a conventional manner by sintering.

The novel thermoplastic materials have the advantage that the green compacts or ceramic moldings produced therefrom are free from cracks and pores even when the wall thicknesses are great.

EXAMPLE 1

5.6 kg/h of a polyoxymethylene which contained 2.5% by weight of butanediol formal as a comonomer were metered into a twin-screw extruder having a 30 mm screw diameter. The material was melted at 180° C. and the screw speed was 70 rpm.

16 kg/h of a mixture of 93% by weight of $Si_3N_4$ powder, 2% by weight of $Al_2O_3$ powder and 5% by weight of $Y_2O_3$ powder, which mixture contained 2 parts by weight of a polyethylene oxide having a molecular weight of 400 g/mol as a dispersant, were metered into an extruder which was flanged to the side of this extruder and was equipped with a conveying screw for powders, and said mixture was heated to 170° C. by the end of the conveying zone.

At the end of the conveying zone, the ceramic powder was mixed with the polyoxymethylene stream, the mixture was subjected to shearing, homogenized and extruded through dies. The extrudates were cooled in a stream of air and granulated. The resulting granules contained about 54% by volume of ceramic powder. They were melted at 180° C. in the barrel of a screw-type injection molding machine and injection molded in a mold having a wall temperature of 110° C. to produce cylinders having a diameter of 50 mm and a height of 40 mm. The sprue was conical and was located on one of the end faces.

The total cycle time was 90 seconds.

After removal from the mold, some cylinders were sawn through along the axis. A large number of cracks and pores measuring up to 6 mm were found in the center of the cylinder.

EXAMPLE 2

Example 1 was repeated, except that, instead of 5.6 kg/h of polyoxymethylene, a mixture of 86% by weight of polyoxymethylene and 14% by weight of an aliphatic polyurethane based on hexamethylene diisocyanate, adipic acid, ethylene glycol, 1,4-butanediol, neopentylglycol and 1,6-hexanediol and having a density of 1.14 g/cm³ and a Shore A hardness of 72 (Baymod ® PU-A from Bayer AG) was melted.

An amount of about 54% by volume of ceramic powder in the mixture was achieved here too. Injection molding was carried out under the same conditions as in Example 1. Radiography showed no cracks in the cylinders produced in this manner.

The subsequent binder removal was carried out in a virtually air-tight drying oven having a volume of 50 l. The atmosphere inside the drying oven was vigorously circulated by means of a fan in order to achieve a constant temperature in the total volume and good heat transfer to the molding from which binder was to be removed.

The drying oven was equipped with one of the injection molded cylinders in such a way that the cylinder was suspended by a wire which was passed upward through the housing of the drying oven and connected to a balance in order to measure the weight loss continuously.

400 l/h of nitrogen were then passed through the oven for 20 minutes in order to displace the air until the oxygen content was less than 1-2%. At the same time, the atmosphere in the drying oven was heated to 150° C. Binder removal was started with the metering of 10 l/h of $BF_3$ into the nitrogen stream of 400 l/h, so that the concentration of $BF_3$ in the metered stream was 2.5% by volume.

With an initial cylinder weight of 202 g, the amount of binder was 25.3% by weight, corresponding to 51.1 g. The Table below shows the decrease in weight as a function of time:

| Time (h) | Decrease in weight (g) | Degree of binder removal (%) |
|---|---|---|
| 0.25 | 8.33 | 16.3 |
| 0.50 | 10.99 | 21.5 |
| 0.75 | 13.29 | 26.0 |
| 1 | 16.35 | 32.0 |
| 1.5 | 20.44 | 40.0 |
| 2 | 24.12 | 47.2 |
| 2.5 | 26.83 | 52.5 |
| 3 | 28.87 | 56.5 |
| 4 | 32.86 | 64.3 |
| 6 | 36.38 | 71.2 |
| 8 | 40.27 | 78.8 |
| 10 | 42.92 | 84.0 |
| 12 | 44.10 | 86.3 |

The cylinder was then heated to 500° C. in the course of 1 hour and was kept at this temperature for 1 hour. The weight decreased by a further 9.3 g, corresponding to a degree of binder removal of 100%. The cylinder showed neither cracks nor any change in dimensions.

EXAMPLE 3

Example 2 was repeated, except that, instead of the aliphatic polyurethane, an amorphous amide copolymer consisting of equal molar amounts of caprolactam, the salt of adipic acid and hexamethylenediamine and the salt of adipic acid and 4,4'-dicyclohexylmethanediamine was used. The amount of ceramic powder was about 53% by volume, owing to the lower density of the polyamide.

After injection molding and binder removal, no cracks were found.

EXAMPLE 4

Example 2 was repeated, except that, instead of the aliphatic polyurethane, an polyethylene oxide having a mean molecular weight of 9,000 g/mol was used. The density of the polyethylene oxide powder was 1.21 g/cm$^3$. The amount of ceramic powder was about 53% by volume.

After injection molding and binder removal, no cracks were found.

EXAMPLE 5

Example 2 was repeated, except that, instead of the aliphatic polyurethane, an polyepoxide which is prepared by reacting 2 molar parts of bisphenol A with 2.6 molar parts of epichlorohydrin was used.

The amount of ceramic powder was about 54% by volume. After injection molding and binder removal, no cracks were found.

EXAMPLE 6

Example 2 was repeated, except that, instead of the aliphatic polyurethane, an polyethyl acrylate having a mean molecular weight of 100,000 used. The polyethyl acrylate was prepared by emulsion polymerization of ethyl acrylate in water. For this purpose, 1% of ammonium stearate was used as an emulsifier and 0.5% (based on the aqueous phase) of ammonium peroxodisulfate was used as the initiator. The polymerization temperature was 70° C. and the amount of ethyl acrylate was 50% by weight.

The resulting 50% strength dispersion of polyethyl acrylate in water was pumped into a melt of polyoxymethylene in an extruder and kneaded with the melt, after which the water was evaporated to give a mixture of 87 parts by weight of polyoxymethylene and 13 parts by weight of polyethyl acrylate. This polymer mixture was melted as in Example 1 and mixed with a stream of ceramic powder in order to obtain a green material which contained 54% by volume of ceramic powder (silicon nitride including additives).

After injection molding and binder removal, no cracks were found.

EXAMPLE 7

Example 6 was repeated, except that, instead of the polyethyl acrylate, polymethyl acrylate was used. The polymethyl acrylate was prepared similarly to the polyethyl acrylate by emulsion polymerization and was mixed with the polyoxymethylene melt. The polymer mixture was melted and was mixed with the ceramic powder to give a green material which contained 54% by weight of silicon nitride, including additives, these steps being carried out as described in Example 1.

After injection molding and binder removal, no cracks were found.

EXAMPLE 8 (according to the invention)

5.6 kg/h of a mixture of granules consisting of 4.5 kg, corresponding to 80% by weight of a polyoxymethylene copolymer containing 6 mol% butanediolformal as a comonomer (component B1) and 1.1 kg, corresponding to 20% by weight of a polyoxymethylene copolymer containing 50 mol% of 1,3-dioxolane as a comonomer (component B2) were metered into a twin-screw extruder having a screw diameter of 30 mm. The melting point of component B1 was 161° C. and that of component B2 was 138° C. Component B2 consisted of a material which did not crystallize until heated for a long time at 90° C. and was slightly tacky owing to the low crystallinity.

The mixture of granules was melted at 180° C. and the screw speed was 70 rpm.

16 kg/h of a mixture of 93% by weight of Si$_3$N$_4$ powder, 2% by weight of Al$_2$O$_3$ powder and 5% by weight of Y$_2$O$_3$ powder, which mixture contained 2% by weight of a polyethylene oxide having a molecular weight of 400 g/mol as a dispersant, were metered into an extruder which was flanged to the side of this extruder and was equipped with a conveying screw for powders, and said mixture was heated to 170° C. by the end of the conveying zone.

At the end of the conveying zone, the ceramic powder was mixed with the polyoxymethylene stream, the mixture was subjected to shearing, homogenized and extruded through dies. The extrudates were cooled in a stream of air and granulated. The resulting granules contained about 54% by volume of ceramic powder. They were melted at 200° C. in the barrel of a screw-type injection molding machine and injection molded in a mold having a wall temperature of 120° C. to produce dumbbells having a length of 150 mm, a width of 10 mm and a thickness of 4 mm for tensile tests. The sprue was located at the end of the rod.

The total cycle time was 90 seconds.

The subsequent binder removal was carried out in a virtually air-tight drying oven having a volume of 50 l. The atmosphere inside the drying oven was vigorously circulated by means of a fan in order to achieve a constant temperature in the total volume and good heat transfer to the molding from which binder was to be removed.

The drying oven was equipped with injection molded dumbbells in such a way that the dumbbells were each placed with the broad side on two supports with a spacing of 130 mm. One dumbbell was placed in a net which was suspended by a wire which was passed upward through the housing of the drying oven and was connected to a balance in order to measure the weight loss continuously.

400 l/h of nitrogen were then passed through the oven for 20 minutes in order to displace the air until the oxygen content was less than 1-2%. At the same time, the atmosphere in the drying oven was heated to 150° C. Binder removal was started with the metering of 10 l/h of BF$_3$ into the nitrogen stream of 400 l/h, so that the concentration of BF$_3$ in the metered stream was 2.5% by volume. With an initial dumbbell weight of 95.4 g, the binder amount of was 25.8% by weight, corresponding to 24.6 g. The table below shows the decrease in weight as a function of time:

| Time (min) | Decrease in weight (g) | Degree of binder removal (%) |
| --- | --- | --- |
| 1 | 2.46 | 10 |
| 2 | 3.7 | 15 |
| 5 | 7.38 | 30 |
| 10 | 11.32 | 46 |
| 15 | 14.76 | 60 |
| 20 | 17.22 | 70 |
| 25 | 19.68 | 80 |
| 30 | 22.14 | 90 |
| 35 | 24.6 | 100 |

When binder removal was complete after 35 minutes, the drying oven was cooled and opened. The dumbbells showed no sag.

EXAMPLE 9 (comparative example)

Example 8 was repeated, except that, instead of the mixtures B1 and B2, a pure polyoxymethylene copolymer containing 15 mol% of butanediolformal was used. The binder material thus contained just as much comonomer as in Example 8. The polyoxymethylene copolymer had a melting point of 152° C. Even during cooling of the extrudates from the extruder discharge, it was found that the extrudates remained soft for a longer time than those in Example 8. Taking into account the low binder density, the content of ceramic powder was once again adjusted to about 54% by volume. However, the subsequent injection molding had to be carried out by a different method:

Because of the lower melting point of the polyoxymethylene containing 15 mol% of comonomer units, the material temperature during injection molding was reduced to 180° C. The mold temperature had to be reduced to about 50° C. because the parts stuck in the mold could scarcely be removed from the mold. To ensure satisfactory mold release, it was also necessary to increase the cooling time in the mold to such an extent that the total cycle time of 90 seconds in Example 8 was increased to 200 seconds.

The resulting dumbbells were subjected to the binder removal procedure at 150° C. as in Example 8, the drying oven being cooled after 35 minutes. The dumbbells showed complete sag between the supports.

EXAMPLE 10 (comparative example)

The dumbbells from Example 9 were subjected to the binder removal procedure at 110° C. instead of 150° C. 385 minutes were required for complete binder removal. In spite of the lower binder removal temperature, the dumbbells sagged by about 10 mm between the supports.

EXAMPLE 11 (according to the invention)

Example 8 was repeated, except that pure poly1,3-dioxolane was used as component B2). The poly-1,3-dioxolane was prepared by metering about 5 ppm of perchloric acid, diluted in dry ether, into 2 kg of pure 1,3-dioxolane under anhydrous conditions. The mixture was slowly heated to 45° C., after which the polymerization began rapidly with an increase in temperature, and the mixture very rapidly became highly viscous. The mixture was left to stand for about 1 hour at 60° C., after which the amount of triethanolamine required for neutralization of the perchloric acid was dissolved in 1,3-dioxolane and the solution was metered in, the temperature was increased to 140° C. and volatile monomers and ether residues were distilled off in the course of 8 hours under a reduced pressure of 10 mbar (1000 Pa).

The amorphous poly-1,3-dioxolane was allowed to cool, and it crystallized at room temperature in the course of two days to such an extent that, after the glass flask had been broken, the poly-1,3-dioxolane could be comminuted to flakes by a flaking roller. The melting point was about 65° C.

5.6 kg/h of a mixture of granules consisting of 4.93 kg/h, corresponding to 88% by weight of a polyoxymethylene copolymer containing 6 mol% of butanediol-formal as a comonomer (component B1) and 0.67 kg/h of poly-1,3-dioxolane as component B2) were metered into a twin-screw extruder having a screw diameter of 30 mm.

The mixture of granules was melted at 180° C. and the screw speed was 70 rpm.

16 kg/h of a mixture of 93% by weight of $Si_3N_4$ powder, 2% by weight of $Al_2O_3$ powder and 5% by weight of $Y_2O_3$ powder, which mixture contained 2% by weight of a polyethylene oxide having a molecular weight of 400 g/mol as a dispersant, were metered into an extruder which was flanged to the side of this extruder and was equipped with a conveying screw for powders, and said mixture was heated to 170° C. by the end of the conveying zone.

At the end of the conveying zone, the ceramic powder was mixed with the polyoxymethylene stream, the mixture was subjected to shearing, homogenized and extruded through dies. The extrudates were cooled in a stream of air and granulated. The resulting granules contained about 54% by volume of ceramic powder. They were converted into test specimens as in the first example and binder was removed from them under the same conditions. These dumbbells exhibited complete removal of binder after 55 minutes and showed no sag.

EXAMPLE 12 (according to the invention)

0.5 kg of 1,3-dioxepan was metered, in the absence of moisture, into a thermostatted kneader having a useful volume of 6 liters and was rapidly polymerized after the addition of 2 ppm of perchloric acid (dissolved in diethylene glycol monomethyl ether). After the polymerization, the polymer was neutralized with 3 ppm of triethanol amine (dissolved in diethylene glycol monomethyl ether).

The kneader was then heated to 180° C. and 2.3 kg of a polyoxymethylene copolymer having a comonomer content of 6 mol% of butanediolformal were added and were mixed thoroughly with the 1,3-dioxepan.

The mixture contained 82% by weight of the polyoxymethylene copolymer (component B1) and 18% by weight of 1,3-dioxepan (component B2). 10.9 kg (corresponding to 54% by volume of the final mixture) of $Al_2O_3$ heated to 180° C. were added in the course of one hour. Stearamide in an amount of 1% by weight, based on the binder content, was added as a processing assistant.

After thorough kneading for one hour, the resulting product was cooled and the resulting crumbly mass was milled to give fragments of 2-3 mm particle size. The converted material was milled into test specimens as in Example 8 and binder was removed from said specimens under the conditions of Example 8.

After 35 minutes, the binder had been completely removed without there being any detectable sagging of the dumbbells.

We claim:

1. A thermoplastic material for the production of ceramic moldings, consisting essentially of:
   A) 40–65% by volume of a sinterable inorganic nonmetallic powder,
   B) 35–60% by volume of a mixture of
      B1) 70–90% by weight of a polyoxymethylene homo- or copolymer having up to 10 mol% of comonomer units and
      B2) 12–30% by weight of
         ($b_1$) a polyoxymethylene copolymer with a comonomer content of 20–99 mol%, poly-1,3-dioxolane, poly-1,3-dioxane or poly-1,3-dioxepan, or
         ($b_2$) an aliphatic polyurethane, an aliphatic uncrosslinked polyepoxide, a poly-($C_2$-$C_6$-alkylene oxide), an aliphatic polyamide or a polyacrylate or a mixture thereof which is homogeneously dissolved or is dispersed with a mean particle size of less than 1 μm in B1), or a mixture thereof, as a binder, and C) 0–5% by volume of a dispersant.

2. A thermoplastic material as claimed in claim 1, wherein component B2) is a polyoxymethylene copolymer with a comonomer content of 20–99 mol%, poly-1,3-dioxolane, poly-1,3-dioxane or poly-1,3-dioxepan, or a mixture thereof.

3. A thermoplastic material as claimed in claim 1, wherein an aliphatic polyurethane, an aliphatic uncrosslinked polyepoxide, a poly-($C_2$–$C_6$-alkylene oxide), an aliphatic polyamide or a polyacrylate or a mixture thereof is used as component B2).

4. A thermoplastic material as claimed in claim 1, wherein component A) is $Al_2O_3$, $ZrO_2$, $Y_2O_3$, SiC, $Si_3N_4$, TiB or AlN or a mixture therof.

5. A ceramic molding produced from a thermoplastic material as claimed in claim 1.

6. A process for removing the binder from a molding of a thermoplastic material consisting essentially of:

A) 40–65% by volume of a sinterable inorganic nonmetallic powder,

B) 35–60% by volume of a mixture of

B1) 70–90% by weight of a polyoxymethylene homo- or copolymer having up to 10 mol% of comonomer units and B2) 10–30% by weight of a polyoxymethylene copolymer with a monomer content of 20–99 mol%, poly-1,3-dioxolane, poly-1,3-dioxane or poly-1,3-dioxepan, or of a polymer which is homogeneously dissolved or is dispersed with a mean particle size of less than 1 μm in B1) or a mixture thereof, as a binder, and C) 0–5% by volume of a dispersant, wherein a) a molding a produced from said thermoplastic material by injection molding or extrusion and b) the molding thus obtained is treated with a gaseous acid-containing atmosphere at from 20° to 160° C. for 0.1–24 h.

7. A process for removing the binder from a molding of a thermoplastic material consisting essentially of:

A) 40–65% by volume of a sinterable inorganic nonmetallic powder,

B) 35–60% by volume of a mixture of

B1) 70–90% by weight of a polyoxymethylene homo- or copolymer having up to 10 mol% of comonomer units and 10–30% by weight of a polyoxymethylene copolymer with a comonomer content of 20–99 mol%, poly-1,3-dioxolane, poly-1,3-dioxane or poly-1,3-dioxepan, or of a polymer which is homogeneously dissolved or is dispersed with a mean particle size of less than 1 μm in B1) or a mixture thereof.

as a binder, and

C) 0–5% by volume of a dispersant, wherein a) a molding is produced from said thermoplastic material by injection molding or extrusion and b) the molding thus obtained is treated with a gaseous acid-containing atmosphere at from 20° to 180° C. for 0.1–24 h and c) is then heated at 250°–500° C. for 0.1–12 h.

8. A thermoplastic material as claimed in claim 1, wherein component B2) is present in an amount of 12–20% by weight.

* * * * *